US008215677B2

(12) United States Patent
Hosoya et al.

(10) Patent No.: US 8,215,677 B2
(45) Date of Patent: Jul. 10, 2012

(54) ARRANGEMENT STRUCTURE FOR CANISTER OF SADDLE TYPE VEHICLE

(75) Inventors: Yukio Hosoya, Wako (JP); Yuichiro Morikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 188 days.

(21) Appl. No.: 12/727,818

(22) Filed: Mar. 19, 2010

(65) Prior Publication Data
US 2010/0243355 A1 Sep. 30, 2010

(30) Foreign Application Priority Data

Mar. 30, 2009 (JP) ................................ 2009-083543

(51) Int. Cl.
*B60K 15/073* (2006.01)
(52) U.S. Cl. ...................................... 280/835; 180/69.4
(58) Field of Classification Search .................. 180/219, 180/218, 68.3, 69.4; 280/834, 835, 833; 123/518–519
See application file for complete search history.

(56) References Cited

U.S. PATENT DOCUMENTS 7,484,766 B2 * 2/2009 Iwasaki .......................... 280/833
2010/0051369 A1 * 3/2010 Kuramochi et al. ......... 180/69.4

FOREIGN PATENT DOCUMENTS
JP 4-353257 A 12/1992
* cited by examiner

*Primary Examiner* — John Walters
*Assistant Examiner* — James Triggs
(74) *Attorney, Agent, or Firm* — Westerman, Hattori, Daniels & Adrian, LLP

(57) ABSTRACT

An arrangement structure is provided for a canister of a saddle type vehicle wherein a canister can be arranged closely to a fuel tank to simplify a pipe arrangement structure. A fuel tank disposed forward of an engine is structured such that a tank upper half and a tank lower half of a concave shape formed by pressing are joined together at joining flanges. The joining flanges are disposed on a vehicle body such that a front portion thereof is positioned on the upper side. A rear inclined wall, which is inclined toward a rear upper direction such that it forms a substantially right angle to the joining flange, is provided at a rear portion of the tank lower half. A canister is disposed in a dead space below the rear inclined wall.

10 Claims, 5 Drawing Sheets

ARRANGEMENT STRUCTURE FOR CANISTER OF SADDLE TYPE VEHICLE

TECHNICAL FIELD

An arrangement structure is provided for a canister which is incorporated in a saddle type vehicle such as a motorcycle and collects fuel gas evaporated in a fuel tank.

BACKGROUND OF THE INVENTION

In a saddle type vehicle such as a motorcycle, a canister for collecting evaporated fuel in a fuel tank is provided, and the fuel collected by the canister is used for combustion in an engine.

As a canister arrangement structure for a scooter type vehicle, a canister arrangement structure is known wherein a canister is arranged in a dead space downward of a rear end portion of a seat for a passenger (refer to Japanese Patent Laid-Open No. Hei 4-353257).

In the scooter type vehicle disclosed in Japanese Patent Laid-Open No. Hei 4-353257, a power unit wherein an engine and a power transmitting apparatus are integrated with each other is provided for upward and downward rocking motion below the seat, and a fuel tank for reserving fuel is provided forward of the power unit.

SUMMARY OF THE INVENTION

However, in this conventional arrangement structure for a canister, since the canister for collecting evaporated fuel in the fuel tank is arranged below a rear end portion of the seat, the length of a charge hose for introducing evaporated fuel in the fuel tank into the canister becomes long, and the product cost increases as much and layout of pipes becomes difficult.

Therefore, an arrangement structure is provided for a canister of a saddle type vehicle wherein a canister can be arranged closely to a fuel tank to simplify a pipe arrangement structure.

An arrangement structure for a canister of a saddle type vehicle which includes a seat (for example, a seat 5 in an embodiment hereinafter described) for a driver, an engine (for example, an engine 22 in the embodiment hereinafter described) disposed below the seat, a fuel tank (for example, a fuel tank 50 in the embodiment hereinafter described) disposed forward of the engine for storing fuel, and a canister (for example, a canister 30 in the embodiment hereinafter described) for collecting evaporated fuel in the fuel tank, is characterized in that the fuel tank includes a tank upper half (for example, a tank upper half 53 in the embodiment hereinafter described) which is a concave shape, is opened to the lower side and has a joining flange (for example, a joining flange 53a in the embodiment hereinafter described) provided on a circumferential edge of the opening on the lower side thereof, and a tank lower half (for example, a tank lower half 54 in the embodiment hereinafter described) which is a concave shape opened to the upper side and has a joining flange (for example, a joining flange 54a in the embodiment hereinafter described) provided on a circumferential edge of the opening on the upper side thereof. It is further characterized in that the tank upper half and the tank lower half are integrated with each other with the joining flanges joined together, and in that the fuel tank is disposed on a vehicle body such that the joining flanges of the tank upper half and the tank lower half are inclined downwardly such that a front portion thereof is positioned higher than a rear portion thereof. It is further characterized in that the tank lower half has a rear inclined wall (for example, a rear inclined wall 54d in the embodiment hereinafter described) provided at a rear portion thereof such that the rear inclined wall is inclined toward the rear upper side to form a substantially right angle with respect to the joining flanges. It is further characterized in that the canister is disposed below the rear inclined wall of the tank lower half.

Since the tank lower half is formed such that the rear inclined wall forms a substantially right angle with respect to the joining flange, a maximum swelling volume on the rear end side is assured without obstructing the die cutting property upon pressing of the tank lower half. Further, the canister is disposed in a dead space below the rear inclined wall.

The arrangement structure is further characterized in that a purge control valve (for example, a purge control valve 31 in the embodiment hereinafter described) for controlling the purge of the absorbed fuel in the canister is disposed below the rear inclined wall of the tank lower half.

The purge control valve is disposed in the dead space below the rear inclined wall together with the canister.

The arrangement structure is further characterized in that the rear inclined wall of the tank lower half has a draft angle with respect to a die cutting direction, and the canister is disposed nearer to the rear inclined wall than a line (for example, a line L2 in the embodiment hereinafter described) extended in the die cutting direction of the tank lower half from a crossing point (for example, a crossing point P in the embodiment hereinafter described) between the rear inclined wall and the joining flange.

The arrangement structure is further characterized in that the canister and the purge control valve are supported on a vehicle body frame (for example, a cross frame 14 in the embodiment hereinafter described) which is disposed in the proximity of a rear portion of the fuel tank and extends in a vehicle widthwise direction.

The arrangement structure is further characterized in that a pivot bracket (for example, a pivot bracket 16 in the embodiment hereinafter described) is attached to the vehicle body frame which extends in the vehicle widthwise direction, and a swing unit (for example, a swing unit 21 in the embodiment hereinafter described) including the engine is connected for upward and downward rocking motion on the pivot bracket.

By this configuration, the swing unit including the engine is supported for rocking motion at a position close to the canister and the purge control valve.

Since the canister is disposed in the dead space below the rear inclined wall formed at a rear portion of the tank lower half in relation to pressing, the canister can be disposed sufficiently closely to the fuel tank without intentionally providing a special purpose space for disposing the canister. Further, since the canister is disposed at a position close to both of the engine and the fuel tank, the length of a charge hose and a purge hose can be reduced to achieve reduction of the part cost and improvement in feasibility in layout of pipes and make the part arrangement around the fuel tank compact.

Since the purge control valve is disposed in the dead space below the rear inclined wall of the tank lower half together with the canister, the purge control valve can be disposed sufficiently closely to the canister and the engine without intentionally providing a special purpose space for disposing the purge control valve. Accordingly, the length of the purge hose which connects the canister and the purge control valve and which connects the purge control valve and the engine can be reduced to achieve reduction of the part cost and improvement in feasibility in layout of pipes and make the part arrangement around the fuel tank compact.

The canister is disposed nearer to the rear inclined wall than the line extended in the die cutting direction of the tank lower half from the crossing point between the rear inclined wall of the tank lower half and the joining flange in the die cutting direction of the tank lower half. Therefore, the canister can be disposed more compactly effectively utilizing the dead space provided by the draft angle of the tank lower half.

Since the canister and the purge control valve are supported on the vehicle body frame which is disposed in the proximity of a rear portion of the fuel tank and extends in the vehicle widthwise direction, the canister and the purge control valve can be supported on the vehicle body without providing a large scale supporting structure.

Since the swing unit including the engine is supported for upward and downward rocking motion at a position close to the canister and the purge control valve, the range of the rocking motion of the purge hose can be reduced.

BRIEF DESCRIPTION OF THE DRAWINGS

The advantages of the invention will become apparent in the following description taken in conjunction with the drawings, wherein.

DETAILED DESCRIPTION OF THE INVENTION

In the following, an embodiment of the present invention is described with reference to the drawings. It is to be noted that, unless otherwise specified, the directions such as the forward, rearward, leftward and rightward directions in the following description coincide with the directions with reference to the vehicle. Further, in the figures, an arrow mark FR denotes the vehicle forward direction and another arrow mark UP denotes the vehicle upward direction.

Figure 1:
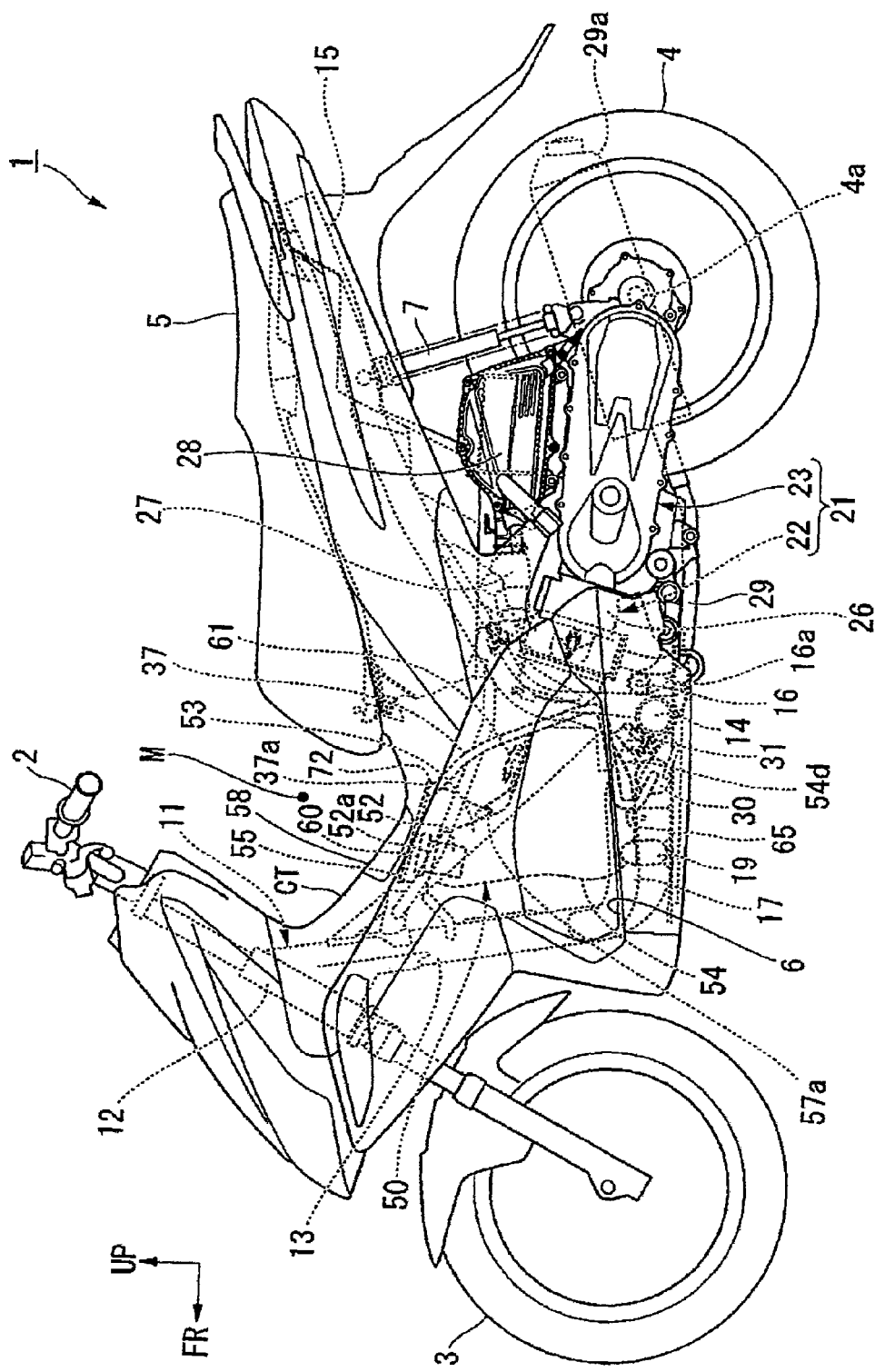
FIG. 1 is a left side elevational view of a motorcycle.

FIG. 1 is a view showing a side face of a motorcycle 1 of the scooter type (scooter type vehicle) which is a form of saddle type vehicle.

As shown in FIG. 1, this motorcycle 1 includes a front wheel 3 steered by a handle bar 2 and a rear wheel 4 driven by a swing unit (power unit) 21.

Steering system parts including the handle bar 2 and the front wheel 3 are supported for steering movement on a head pipe 12 at a front end of a vehicle body frame 11. The swing unit 21 is supported at a front end portion thereof for upward and downward rocking motion to a rear portion of the vehicle body frame 11. A saddle type seat (hereinafter referred to simply as seat) 5 for a passenger is disposed on the vehicle body rear side with respect to the handle bar 2, and a straddling section M depressed a downwardly with respect to the seat 5 is provided between the handle bar 2 and the seat 5. Floor steps 6 for receiving the feet of a passenger seated on the seat 5 thereon are provided on the opposite left and right sides of the straddling section M. A center tunnel section CT having a swollen sectional shape which is upwardly convex and is provided between the left and right floor steps 6 such that it extends in a vehicle body forward and rearward direction. This center tunnel section CT is formed from a panel member made of resin or metal.

FIGS. 2 to 5 are views showing a region from a front end portion to an intermediate portion of the vehicle body frame 11 and various parts attached to the vehicle body frame 11.

The vehicle body frame 11 includes the head pipe 12 for supporting the steering system parts such as the handle bar 2 and the front wheel 3, a main frame 13 extending obliquely downwardly from the head pipe 12, a pair of left and right sub frames 17 (not shown in FIG. 2) joined to a lower edge portion of the main frame 13 from the opposite left and right sides and extending from the joined portions thereof toward the vehicle body rear side after they are curved to the outer sides in the vehicle widthwise direction, a cross frame 14 extending in the vehicle body widthwise direction at the position of rear ends of the sub frames 17 and having rear end portions of the sub frames 17 joined thereto, and a pair of rear frames 15 extending upwardly from the opposite side edge portions of the cross frame 14 and then extending obliquely rearwardly upwards of the vehicle body.

A sub cross frame 19 curved downwardly and extending in the vehicle widthwise direction is joined to front edge portions of the left and right sub frames 17 and a curved lower end of the main frame 13 is joined to a central portion of the sub cross frame 19. Further, a pivot bracket 16 (refer to FIG. 1) is attached to a rear portion of the cross frame 14, and the swing unit 21 is connected at a front end portion thereof for upward and downward rocking motion on the pivot bracket 16.

Figure 3:
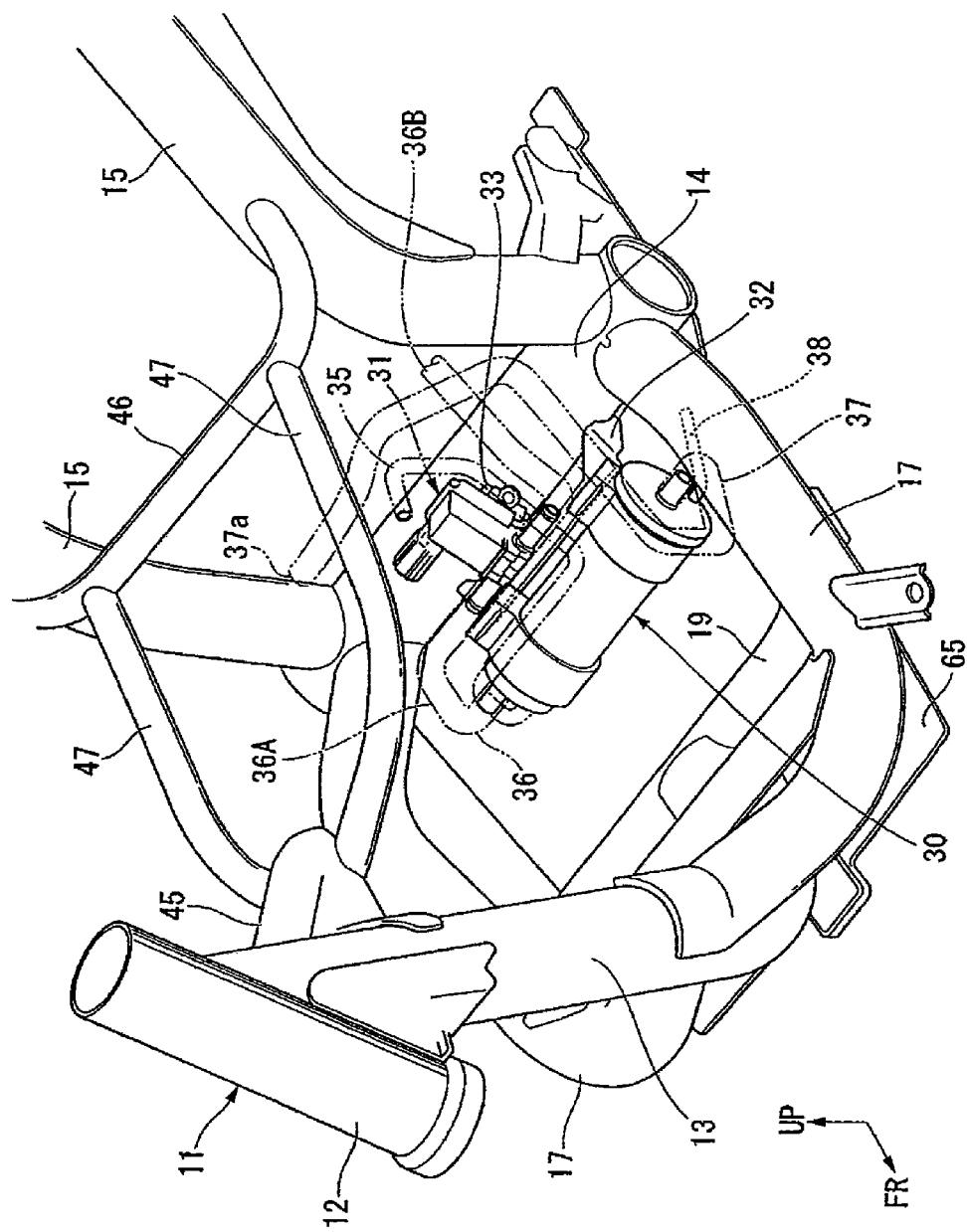
FIG. 3 is a perspective view showing a central portion of the motorcycle with covers, a fuel tank and so forth removed.
Figure 4:
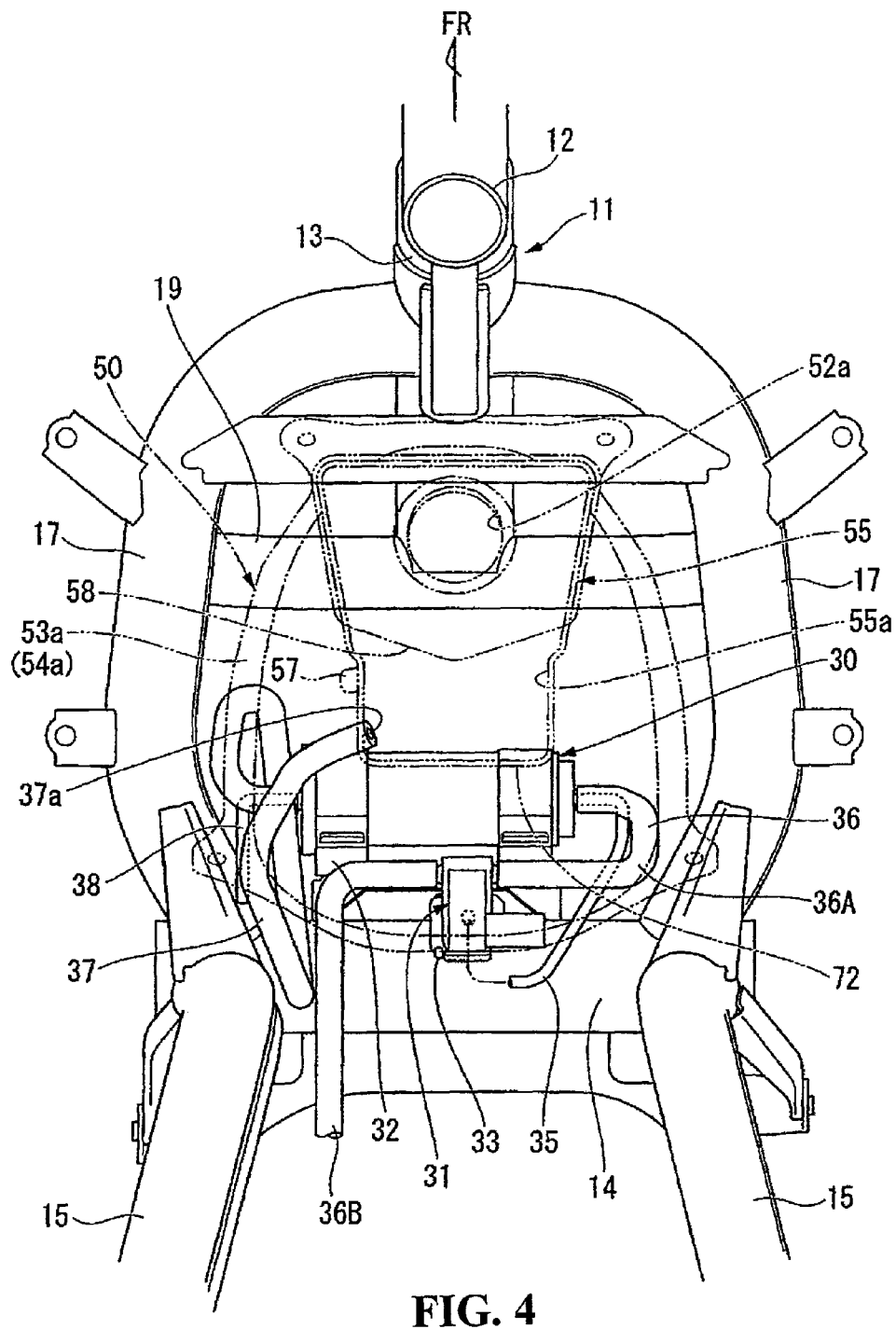
FIG. 4 is a top plan view showing a central portion of the motorcycle with covers, the fuel tank and so forth removed.
Figure 5:
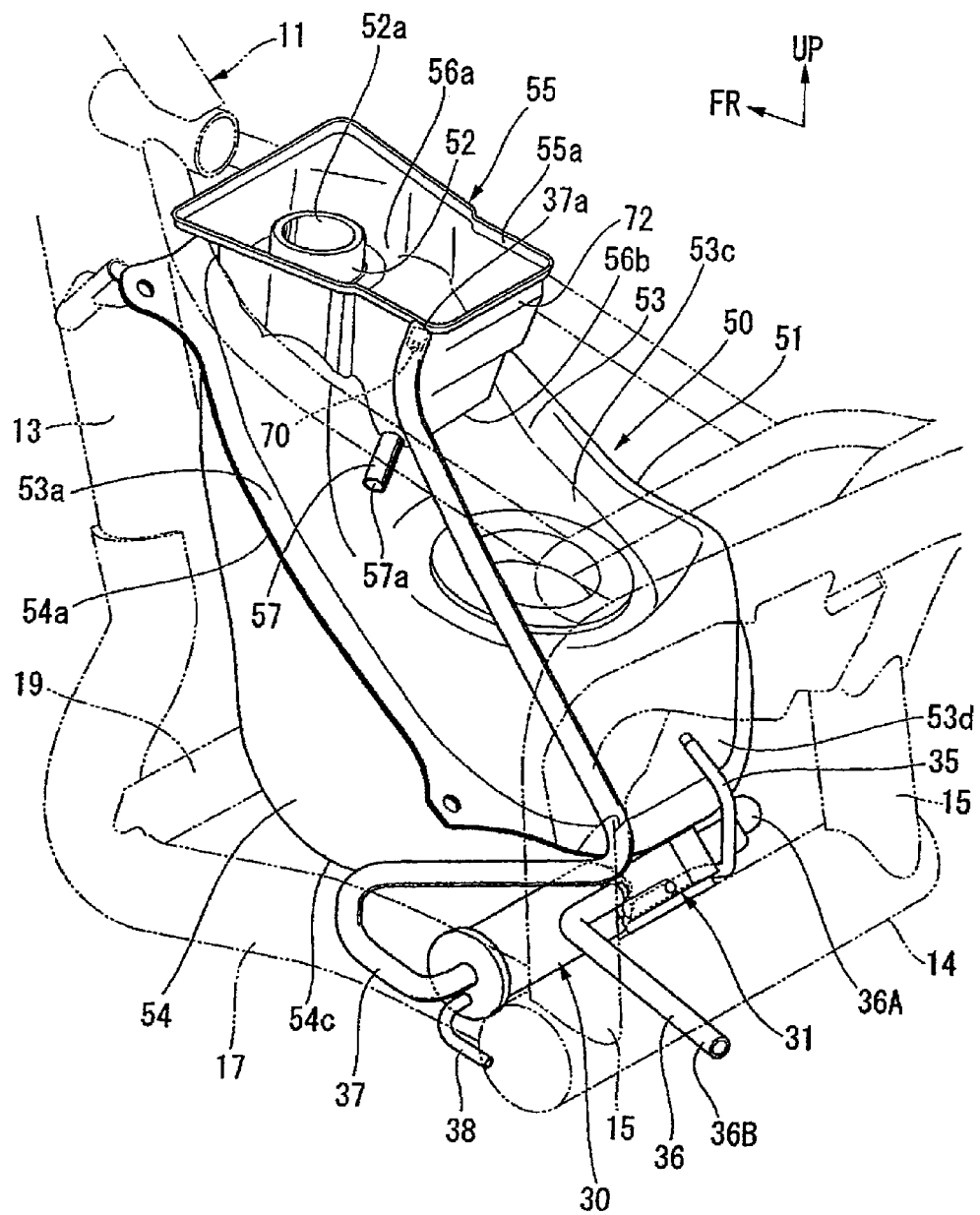
FIG. 5 is a perspective view showing a central portion of the motorcycle with covers, a vehicle body frame and so forth removed.

Further, a fixing block 45 which projects to the rear side as shown in FIG. 3 is provided in the proximity of an upper end portion of the main frame 13, and a sub cross frame 46 for connecting the rear frames 15 is provided at upper ends of the upwardly extending portions of the rear frames 15. Left and right edge portions of the fixing block 45 and the sub cross frame 46 are connected to each other by upper sub frames 47.

The swing unit 21 shown in FIG. 1 is a swing type power unit wherein an engine 22 and a power transmitting mechanism 23 are formed as an integrated block, and is connected at a front end portion thereof to the pivot bracket 16 through a suspension link 16a. A rear cushion 7 is interposed between a rear end portion of the power transmitting mechanism 23 and a rear frame 15, and vibration or an impact upon traveling is absorbed by the rear cushion 7.

The engine 22 (internal combustion engine) is a water-cooled single cylinder engine wherein a crankshaft (not shown) is disposed so as to extend in the vehicle widthwise direction, and a head portion of the cylinder 26 projects to the front side in such a manner that it is inclined in an obliquely upward direction rather than a horizontal direction.

Meanwhile, the power transmitting mechanism 23 includes a belt type variable speed change gear, and is disposed on a left side portion of the engine 22 and transmits rotating power of the engine 22 to a rear wheel axle 4a.

Further, an air cleaner 28 is connected to the intake side of the engine 22 through a throttle body 27, and a silencer 29a on the vehicle body rear side is connected to the exhaust side of the engine 22 through an exhaust pipe 29.

A fuel tank 50 for reserving fuel to be used by the engine 22 is disposed in a space surrounded by the main frame 13, the left and right sub frames 17 and the upwardly extending portions of the left and right rear frames 15.

The fuel tank 50 is configured such that a feed fuel pipe 52 formed from a circular steel pipe is jointed integrally by welding or the like to an upper portion of a tank body 51 which is an article produced by presswork of a steel plate. An opening at an upper end portion of the feed fuel pipe 52 is used as a fuel filler 52a, and this fuel filler 52a is removably closed up with a filler cap 60.

The tank body 51 is configured such that a tank upper half 53 which forms an upper half of the tank body 51 and a tank lower half 54 which forms a lower half of the tank body 51 are joined integrally with each other by welding. A parting plane B (refer to FIG. 2) between the tank upper half 53 and the tank lower half 54 is inclined rearwardly downwards, and joining flanges 53a and 54a of the tank upper half 53 and the tank lower half 54 are provided along the parting plane B. The joining flanges 53a and 54a are provided continuously on the front and rear and the left and right of the tank body 51, and the joining flanges 53a and 54a are supported at front portions and rear portions thereof on the vehicle body frame 11.

Figure 2:
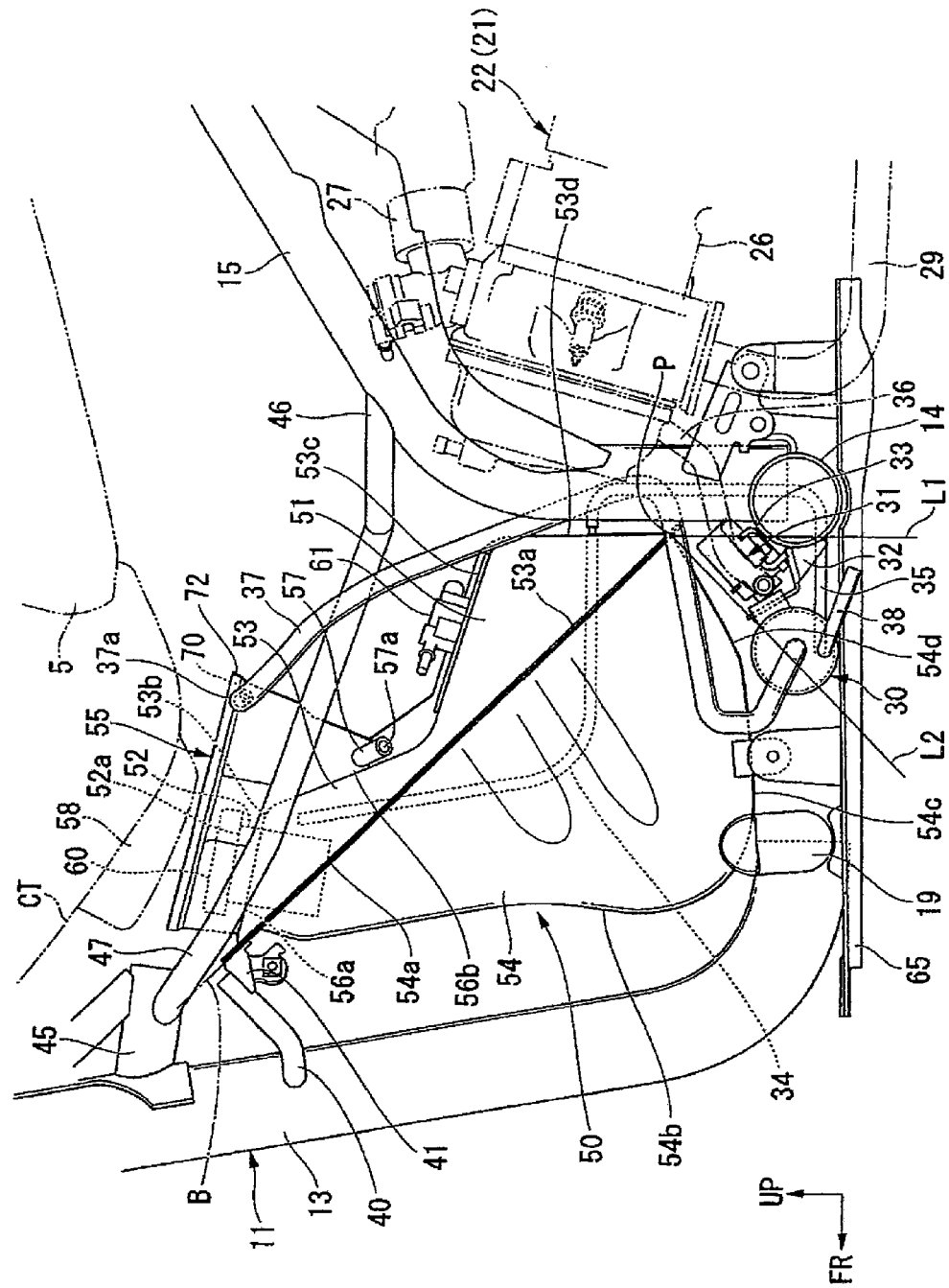
FIG. 2 is a side elevational view showing a central portion of the motorcycle with covers and sub frames removed.

More particularly, as shown in FIG. 2, the joining flanges 53a and 54a are connected to left and right brackets 40, which are provided fixedly at the opposite left and right edge portions on the front side thereof, each through a fixing block 41 and are coupled at the opposite edge portions on the rear portion side thereof to a connecting portion among three members of the cross frame 14, sub frame 17 and rear frame 15 through brackets and gussets (not shown).

The tank upper half 53 is a pressed part (pattern shaped member) of a concave shape which is open to the lower side, and the joining flange 53a is formed in a circumferential region of the lower side opening. The tank upper half 53 includes a front upper wall 53b connecting to a front region of the joining flange 53a and having the feed fuel pipe 52 provided at a substantially central portion thereof, a rear upper wall 53c provided continuously to a rear end portion of the front upper wall 53b in such a manner as to be bent to the substantially downward direction, and a rear wall 53d bent vertically downwardly from a rear end portion of the rear upper wall 53c and connecting to a rear region of the joining flange 53a. The rear wall 53d is opposed to a head portion of the engine 22 of the swing unit 21, which is disposed on the rear side with respect to the rear wall 53d, with a predetermined gap left therebetween. Further, a fuel pump 61 for pressure feeding fuel reserved in the fuel tank 50 toward an injector (not shown) of the engine 22 is provided fixedly on the rear upper wall 53c.

The tank lower half 54 is a pressed part (pattern shaped member) of a concave shape open to the upper side, and the joining flange 54a is formed in a circumferential region of the upper side opening. The tank lower half 54 includes a front wall 54b extending downwardly from a front region of the joining flange 54a, a bottom wall 54c bent to the rear side from a lower end of the front wall 54b and extending substantially horizontally, and a rear inclined wall 54d inclined upwardly rearwards from a rear end of the bottom wall 54c and connecting to a rear region of the joining flange 54a. The inclination angle of the rear inclined wall 54d is set such that it defines a substantially right angle with respect to the joining flange 54a which extends along the parting plane B.

Here, supplementarily describing the inclination angle of the rear inclined wall 54d, the inclination angle of the rear inclined wall 54d is determined taking a die cutting property in pressing and the volume assurance of the fuel tank 50 into consideration when the tank lower half 54 is shaped by pressing (die forming).

In particular, in order to achieve an increase in the tank volume during pressing of the tank lower half 54, the die of a pressing apparatus is designed such that the joining flange 54a portion comes to the parting portion, it is effective to increase the extension angle of the rear inclined wall 54d from the joining flange 54a to the vertically downward side. Reference symbol L1 in FIG. 2 denotes a vertical line drawn from a crossing point P between the joining flange 54a and the rear inclined wall 54d, and in order to achieve increase of the tank volume, it is effective to set the extension angle of the rear inclined wall 54d near to the vertical line L1. However, if the die cutting property upon pressing at this time is taken into consideration, then with regard to the inclination angle of the rear inclined wall 54d, an angle along the die cutting direction (line L2 in FIG. 2) becomes a critical angle upon die casting. That is, an angle substantially equal to the right angle to the joining flange 54a becomes a critical angle upon die cutting. Accordingly, from such a background as just described, the inclination angle of the rear inclined wall 54d is set such that it makes a substantially right angle to the joining flange 54a.

In the case of the present embodiment, more particularly, in order to make die cutting upon pressing better, the rear inclined wall 54d has a predetermined draft angle with respect to the die cutting direction (L2).

Incidentally, a canister 30 and a purge control valve 31 are attached to the cross frame 14, which is disposed at a position close to a rear portion of the fuel tank 50, through stays 32 and 33, respectively.

The canister 30 is provided to absorb fuel evaporated in the fuel tank 50 so that the absorbed fuel is used for combustion upon operation of the engine 22 and is configured such that a fuel collection section composed of activated carbon or the like is provided in the inside of a canister body of a substantially cylindrical shape. Meanwhile, the purge control valve 31 is provided to control the fuel purge in the canister 30 and is controlled by a controller (not shown).

Further, the canister 30 is disposed along the vehicle widthwise direction in a space below the rear inclined wall 54d of the tank lower half 54, forward of the cross frame 14. More particularly, the canister 30 is disposed at a position nearer to the rear inclined wall 54d in the space below the rear inclined wall 54d of the tank lower half 54 than the line L2 drawn in the die cutting direction of the tank lower half 54 from the crossing point P between the rear inclined wall 54d and the joining flange 54a.

Further, the purge control valve 31 is disposed in the rear upper side of the canister 30 in a space on the obliquely forward side of an upper portion of the cross frame 17 below the rear inclined wall 54d.

As shown in FIG. 2, a gas exhaust passage 34 for exhausting evaporated fuel in an upper portion of the fuel tank 50 to the outside of the fuel tank 50 through the rear wall 53d of the tank upper half 53 of the fuel tank 50 is provided in the fuel tank 50.

A charge hose 35 connected to the gas exhaust passage 34 of the fuel tank 50 and a purge hose 36 connected to the intake system of the engine 22 are connected in parallel to each other to one end side (vehicle body right side) in the axial direction of the canister 30. An opening hose 37 (atmosphere-opening passage) for communicating the fuel collection section and the atmosphere with each other and a drain pipe 38 for discharging fuel and water drops to the outside are connected in parallel to each other to the other end side (vehicle body left side) in the axial direction of the canister 30. The purge control valve 31 is interposed in the purge hose 36 which connects the canister 30 and the intake system of the engine 22 to each other. It is to be noted that reference symbol 36A denotes a hose on the upstream side (fuel tank 50 side) of the purge hose 36, and 36B a hose on the downstream side (engine 22 side) of the purge hose 36.

Further, reference symbol 65 in the figure denotes an undercover for covering the fuel tank 50, canister 30 and so forth from below.

A fuel tray 55 for receiving fuel leaking from the fuel filler 52a to the outside upon refueling is attached to an upper portion near to a front portion of the fuel tank 50. The fuel tray 55 is formed in a substantially concave shape open upwardly, and a bottom wall 56a on the front side of the fuel tray 55 is placed on the front upper wall 53b of the fuel tank 50 while the feed fuel pipe 52 projecting from the fuel tank 50 extends upwardly through the bottom wall 56a on the front side of the fuel tray 55. Consequently, the fuel filler 52a is disposed on the inner side of the fuel tray 55.

A bottom wall 56b on the rear side of the fuel tray 55 projects downwardly substantially in a V shape, and a drain pipe 57 which projects sidewardly downward of the vehicle body is provided at a side portion of the bottom wall 56b projecting substantially in the V shape. A drain hole 57a for communicating the inside and the outside of the fuel tray 55 with each other is provided in the drain pipe 57. The drain hole 57a discharges fuel flowing out from the fuel filler 52a into the inside of the fuel tray 55 upon refueling.

An opening 55a at an upper portion of the fuel tray 55 is formed in a distorted rectangle which somewhat narrows rearwardly, and a connecting port (not shown) for communicating the inside and the outside of the fuel tray 55 with each other is provided at an upper edge portion of one side of the opening 55a (upper edge portion on the vehicle body left side). An opening end 37a of the opening hose 37 is connected to the connecting port. It is to be noted that the connecting port of the fuel tray 55 is disposed at a position higher than the drain hole 57a.

A fuel lid 58 for openably closing the upper side of the fuel filler 52a and the fuel tray 55 is provided on the center tunnel section CT on the front side of the seat 5. Upon fueling, the fuel lid 58 is opened and the filler cap 60 is removed, and then a fueling nozzle is inserted into the fuel filler 52a to introduce fuel into the fuel tank 50.

The inside space of the fuel tray 55 with which the opening end 37a of the opening hose 37 is communicated is normally (when the fuel lid 58 is in a closed state) closed up on the upper side thereof with the fuel lid 58 so as to prevent admission of dust and water drops from the outside.

In the motorcycle 1 configured in such a manner as described above, since the cylindrical canister 30 is disposed along the widthwise direction in the dead space below the rear inclined wall 54d formed at a rear portion of the tank lower half 54 in relation to pressing, the canister 30 can be disposed sufficiently closely to the fuel tank 50 without newly providing a special purpose space for disposing the canister 30.

Accordingly, by adopting such an arrangement structure of the canister 30 as described above, it is possible to reduce the length of the charge hose 35 for connecting the canister 30 and the fuel tank 50 to each other to achieve reduction of the part cost and improvement in feasibility in layout of pipes. Further, in the present arrangement structure, since the canister 30 and the fuel tank 50 are disposed sufficiently closely to each other, the part arrangement around the fuel tank 50 becomes compact, and the arrangement structure of the canister 30 becomes more advantageous for installation in a vehicle.

Further, particularly in the arrangement structure of the canister 30 in the present embodiment, the rear inclined wall 54d of the tank lower half 54 has a draft angle, and the canister 30 is disposed at a position in the space below the rear inclined wall 54d which is displaced toward the rear inclined wall 54d with respect to the line L2 drawn from the crossing point P between the rear inclined wall 54d and the joining flange 54a toward the die cutting direction of the tank lower half 54. Therefore, the canister 30 can be disposed more compactly effectively utilizing the dead space produced by the draft angle of the tank lower half 54.

Further, in the arrangement structure of the canister 30 adopted by the motorcycle 1, since the purge control valve 31 is disposed together with the canister 30 in the dead space below the rear inclined wall 54d formed in a rear portion of the tank lower half 54, the purge control valve 31 can be disposed sufficiently closely to the canister 30 and the engine 22 without newly providing a special purpose space for disposing the purge control valve 31. Particularly in the present embodiment, since the purge control valve 31 is disposed between the canister 30 and the engine 22, the purge control valve 31 can be disposed sufficiently closely to both of the canister 30 and the engine 22.

Accordingly, by adopting the present arrangement structure, the length of the hoses 36A and 36B (purge hose 36) for connecting the canister 30 and the purge control valve 31 to each other and for connecting the purge control valve 31 and the engine 22, respectively, can be reduced to achieve reduction of the part cost and improvement in feasibility in layout of pipes. Particularly in the present embodiment, since the canister 30 and the purge control valve 31 are disposed in an intensive form in the space below the rear inclined wall 54d of the tank lower half 54, the part arrangement around the fuel tank 50 can made more compact.

Further, in the structure of the present embodiment, since the canister 30 and the purge control valve 31 are supported on the cross frame 14 which extends in the vehicle widthwise direction in the proximity of a rear portion of the fuel tank 50, the canister 30 and the purge control valve 31 can be supported on the vehicle body without providing a large scale supporting structure separately.

Further, in the structure of the present embodiment, since the swing unit 21 including the engine 22 is supported for upward and downward rocking motion at a rear portion of the cross frame 14 at a position close to the canister 30 and the purge control valve 31 by the pivot bracket 16, the amount of rocking motion of the purge hose 36 which connects the purge control valve 31 and the intake system of the engine 22 to each other can be reduced.

It is to be noted that the present invention is not limited to the embodiment described above but allows various changes of design without departing from the subject matter of the invention. For example, the arrangement structure for a canister described above can be applied not only to a motorcycle having the center tunnel section CT but also a saddle type vehicle which does not have the center tunnel section CT but has a substantially flat floor step and a saddle type vehicle which does not have a floor step but has a step bar or a step board.

Although a specific form of embodiment of the instant invention has been described above and illustrated in the accompanying drawings in order to be more clearly understood, the above description is made by way of example and not as a limitation of the scope of the instant invention. It is contemplated that various modifications apparent to one of ordinary skill in the art could be made without departing from the scope of the invention which is to be determined by the following claims.

We claim:

1. A vehicle, comprising:
a seat for a driver,
an engine disposed below said seat,
a fuel tank which stores fuel, disposed forward of said engine, said fuel tank including
a tank upper half which is a concave shape and has an opening on a lower side thereof, said tank upper half including a joining flange provided on a circumferential edge of said opening on the lower side thereof, and
a tank lower half which is a concave shape and has an opening on an upper side thereof, said tank lower half including a joining flange provided on a circumferential edge of said opening on the upper side thereof and a rear inclined wall provided at a rear portion of said tank lower half which forms a substantially right angle with respect to said joining flange of said tank lower half, and
a canister which collects evaporated fuel from said fuel tank, wherein said tank upper half and said tank lower half are joined by said joining flanges,
wherein said fuel tank is disposed on a vehicle body such that said joining flanges of said tank upper half and said tank lower half are inclined downwardly so that a front portion of said joining flanges is positioned higher than a rear portion of said joining flanges,
wherein said fuel tank is disposed on the vehicle body such that said rear inclined wall of said tank lower half is inclined toward a rear upper side of the vehicle, and
wherein said canister is disposed below the rear inclined wall of said tank lower half.

2. The vehicle according to claim 1, further comprising a purge control valve which controls purging of absorbed fuel in said canister, said purge control valve being disposed below said rear inclined wall of said tank lower half.

3. The vehicle according to claim 1,
wherein said rear inclined wall of said tank lower half has a draft angle with respect to a die cutting direction, and
wherein said canister is disposed nearer to said rear inclined wall than a line extended in the die cutting direction of said tank lower half from a crossing point of said rear inclined wall and said joining flange of said tank lower half.

4. The vehicle according to claim 2,
wherein said rear inclined wall of said tank lower half has a draft angle with respect to a die cutting direction, and
wherein said canister is disposed nearer to said rear inclined wall than a line extended in the die cutting direction of said tank lower half from a crossing point of said rear inclined wall and said joining flange of said tank lower half.

5. The vehicle according to claim 2, wherein said canister and said purge control valve are supported on a vehicle body frame portion which is disposed in the proximity of a rear portion of said fuel tank and which extends in a vehicle widthwise direction.

6. The vehicle according to claim 3, wherein said canister and said purge control valve are supported on a vehicle body frame portion which is disposed in the proximity of a rear portion of said fuel tank and which extends in a vehicle widthwise direction.

7. The vehicle according to claim 4, wherein said canister and said purge control valve are supported on a vehicle body frame portion which is disposed in the proximity of a rear portion of said fuel tank and which extends in a vehicle widthwise direction.

8. The vehicle according to claim 5, further comprising a pivot bracket attached to said vehicle body frame portion, and a swing unit connected to said pivot bracket, said swing unit including said engine capable of upward and downward rocking motion.

9. The vehicle according to claim 6, further comprising
a pivot bracket attached to said vehicle body frame portion, and
a swing unit connected to said pivot bracket, said swing unit including said engine capable of upward and downward rocking motion.

10. The vehicle according to claim 7, further comprising
a pivot bracket attached to said vehicle body frame portion, and
a swing unit connected to said pivot bracket, said swing unit including said engine capable of upward and downward rocking motion.

* * * * *